United States Patent
Jiang et al.

(10) Patent No.: US 10,477,571 B2
(45) Date of Patent: Nov. 12, 2019

(54) COMMUNICATION TERMINAL, BASE STATION, MONITORING METHOD, TRANSMISSION METHOD, AND NON-TRANSITORY COMPUTER-READABLE MEDIUM

(71) Applicant: NEC Corporation, Minato-ku, Tokyo (JP)

(72) Inventors: Yi Jiang, Tokyo (JP); Hisashi Futaki, Tokyo (JP); Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/763,162

(22) PCT Filed: Sep. 2, 2016

(86) PCT No.: PCT/JP2016/004022
§ 371 (c)(1),
(2) Date: Mar. 26, 2018

(87) PCT Pub. No.: WO2017/056396
PCT Pub. Date: Apr. 6, 2017

(65) Prior Publication Data
US 2018/0279350 A1  Sep. 27, 2018

(30) Foreign Application Priority Data
Sep. 30, 2015 (JP) .................. 2015-193033

(51) Int. Cl.
*H04W 72/12* (2009.01)
*H04W 24/08* (2009.01)
(Continued)

(52) U.S. Cl.
CPC ....... *H04W 72/1289* (2013.01); *H04W 24/08* (2013.01); *H04W 28/04* (2013.01);
(Continued)

(58) Field of Classification Search
CPC ..... H04W 28/04; H04W 72/04; H04W 24/08; H04W 52/0225; H04W 52/0245;
(Continued)

(56) References Cited

U.S. PATENT DOCUMENTS

| | | | |
|---|---|---|---|
| 8,547,928 B2 | 10/2013 | Lv et al. | |
| 2015/0305083 A1* | 10/2015 | Heo | H04W 4/70 370/329 |

(Continued)

OTHER PUBLICATIONS

Nokia, et al., 3GPP TSG RAN WG1 Meeting #73, R1-132300, "On PDCCH-less subframes—PDSCH/EPDCCH starting in Symbol#0", Fukuoka, Japan, May 2013 (3 pages total).

(Continued)

*Primary Examiner* — Brian D Nguyen

(57) ABSTRACT

To provide a communication terminal capable of suppressing an increase in power consumption of a UE during multi-subframe scheduling, a communication terminal (10) includes a monitoring unit (11) that monitors control information containing allocation information of at least one subframe where downlink data is transmitted, and a control unit (12) that determines monitoring timing to monitor the control information in accordance with a decoding result of downlink data transmitted using the at least one subframe. The monitoring unit (11) monitors the control information at the determined monitoring timing.

16 Claims, 14 Drawing Sheets

(51) Int. Cl.
*H04W 52/02* (2009.01)
*H04W 28/04* (2009.01)
*H04W 72/04* (2009.01)
*H04W 88/08* (2009.01)

(52) U.S. Cl.
CPC ... *H04W 52/0225* (2013.01); *H04W 52/0245* (2013.01); *H04W 72/04* (2013.01); *H04W 88/08* (2013.01); *Y02D 70/00* (2018.01); *Y02D 70/1262* (2018.01); *Y02D 70/1264* (2018.01)

(58) Field of Classification Search
CPC .. H04W 72/1289; H04W 88/08; Y02D 70/00; Y02D 7/1264; Y02D 7/1262
See application file for complete search history.

(56) References Cited

U.S. PATENT DOCUMENTS

| | | | | |
|---|---|---|---|---|
| 2015/0334756 | A1* | 11/2015 | Lu | H04W 76/14 370/329 |
| 2016/0021700 | A1* | 1/2016 | Oh | H04W 52/0229 370/311 |
| 2016/0165539 | A1* | 6/2016 | Yi | H04W 52/0216 370/311 |
| 2016/0330633 | A1* | 11/2016 | You | H04L 5/0053 |
| 2016/0360510 | A1* | 12/2016 | Lee | H04L 5/1469 |
| 2018/0262989 | A1* | 9/2018 | Wu | H04W 52/0216 |

OTHER PUBLICATIONS

LG Electronics, 3GPP TSG RAN WG1 Meeting #80bis, R1-151495, "UE power consumption reduction", Belgrade, Serbia, Apr. 2015 (2 pages total).

China Telecom, 3GPP TSG RAN WG1 Meeting #73, R1-132202, "Discussion on multi-subframe scheduling", Fukuoka, Japan, May 2013 (5 pages total).

NEC Group, 3GPP TSG RAN WG1 Meeting #73, R1-132336, "Multi-subframe and cross-subframe scheduling in small cells", Fukuoka, Japan, May 2013 (3 pages total).

Communication dated Mar. 14, 2019, from the European Patent Office in counterpart European Application No. 16850577.4.

The 3rd Generation Partnership Project, Technical Specification Groups, Radio Access Networks, 3GPP TSG RAN WG1 Meeting #82bis, R1-155285, "On DL control signalling enhancements for CA up to 32 CCs", NEC, Sep. 25, 2015, total 5 pages.

The 3rd Generation Partnership Project, Technical Specification Groups, Radio Access Networks, 3GPP TSG RAN WG1 Meeting #82, R1-154467, "On reducing the number of DL control blind decodes", Nokia Networks, Aug. 14, 2015, total 7 pages.

The 3rd Generation Partnership Project, Technical Specification Groups, Radio Access Networks, 3GPP TSG RAN WG1 Meeting #82, R1-154466, "On the false detection problem with an increasing number of DL component carriers", Nokia Networks, Aug. 14, 2015, total 6 pages.

International Search Report for PCT Application No. PCT/JP2016/004022, dated Nov. 15, 2016.

\* cited by examiner

COMMUNICATION TERMINAL, BASE STATION, MONITORING METHOD, TRANSMISSION METHOD, AND NON-TRANSITORY COMPUTER-READABLE MEDIUM

This application is a National Stage Entry of PCT/JP2016/004022 filed on Sep. 2, 2016, which claims priority from Japanese Patent Application 2015-193033 filed on Sep. 30, 2015, the contents of all of which are incorporated herein by reference, in their entirety.

TECHNICAL FIELD

The present invention relates to a communication terminal, a base station, a monitoring method, a transmission method, and a program and, particularly, to a communication terminal, a base station, a monitoring method, a transmission method, and a program for performing wireless communication.

BACKGROUND ART

3GPP (3rd Generation Partnership Project) defines techniques related to various mobile communication systems and, for example, defines a technique related to LTE (Long Term Evolution) as a wireless access method in a mobile communication system. In the LTE, available radio resources are allocated to a communication terminal (which is referred to hereinafter as a UE (User Equipment)). A UE can receive downlink data or transmit uplink data by using the allocated radio resources.

A UE receives downlink data using the radio resources allocated to the UE through the PDSCH (Physical Downlink Shared Channel) defined in the 3GPP. Further, a UE can recognize the radio resources allocated to the UE by receiving the PDCCH (Physical Downlink Control Channel) defined in the 3GPP. The radio resources allocated to a UE are subframes, for example. A UE can receive downlink data by decoding downlink data transmitted in a scheduled subframe, for example. Subframe scheduling information is set to the PDCCH.

The subframe scheduling method includes dynamic scheduling and multi-subframe scheduling. In dynamic scheduling, a subframe for transmitting downlink data and a subframe for transmitting control information (PDCCH) containing scheduling information for using the subframe or the like are the same. Thus, for each subframe, the scheduling information of the subframe is set.

On the other hand, in multi-subframe scheduling, scheduling information of a plurality of subframes allocated to a UE are set in one control information. Thus, a subframe allocated to a UE may be different from a subframe in which control information is transmitted. By using multi-subframe scheduling, it is possible to reduce the PDCCH for transmitting the scheduling information of downlink data and reduce the overhead of a control signal.

Patent Literature 1 discloses a technique that defines a new DCI (Downlink Control Information) format in multi-subframe scheduling, and sets scheduling information regarding Multi-subframe scheduling by using the new DCI format.

CITATION LIST

Patent Literature

PTL1: U.S. Pat. No. 8,547,928

SUMMARY OF INVENTION

Technical Problem

In general, all subframes have a region to set the PDCCH. Therefore, a UE needs to monitor the PDCCH in all subframes in order to receive the scheduling information regarding multi-subframe scheduling. However, power consumption of a UE increases when the PDCCH in all subframes is monitored.

An exemplary object of the present invention is to provide a communication terminal, a base station, a monitoring method, a transmission method and a program that can prevent an increase in power consumption of a UE when performing multi-subframe scheduling.

Solution to Problem

A communication terminal according to a first exemplary aspect of the present invention includes a monitoring unit configured to monitor control information containing allocation information of at least one subframe where downlink data is transmitted, and a control unit configured to determine monitoring timing to monitor the control information in accordance with a decoding result of downlink data transmitted using the at least one subframe, wherein the monitoring unit monitors the control information at the determined monitoring timing.

A base station according to a second exemplary aspect of the present invention includes a communication unit configured to transmit, to a communication terminal, control information containing allocation information of at least one subframe to transmit downlink data, and a control unit configured to determine transmission timing to transmit the control information to the communication terminal in accordance with a decoding result of downlink data transmitted using the at least one subframe in the communication terminal, wherein the communication unit transmits the control information at the determined transmission timing.

A monitoring method according to a third exemplary aspect of the present invention includes monitoring control information containing allocation information of at least one subframe where downlink data is transmitted, determining monitoring timing to monitor the control information in accordance with a decoding result of downlink data transmitted using the at least one subframe, and monitoring the control information at the determined monitoring timing.

A transmission method according to a fourth exemplary aspect of the present invention includes transmitting, to a communication terminal, control information containing allocation information of at least one subframe to transmit downlink data, determining transmission timing to transmit the control information to the communication terminal in accordance with a decoding result of downlink data transmitted using the at least one subframe in the communication terminal, and transmitting the control information at the determined transmission timing.

A program according to a fifth exemplary aspect of the present invention causes a computer to execute monitoring control information containing allocation information of at least one subframe where downlink data is transmitted, determining monitoring timing to monitor the control information in accordance with a decoding result of downlink data transmitted using the at least one subframe, and monitoring the control information at the determined monitoring timing.

Advantageous Effects of Invention

According to exemplary aspects of the present invention, it is possible to provide a communication terminal, a base station, a monitoring method, a transmission method and a program that can suppress an increase in power consumption of a UE when performing multi-subframe scheduling.

DESCRIPTION OF EMBODIMENTS

First Exemplary Embodiment

Figure 1:
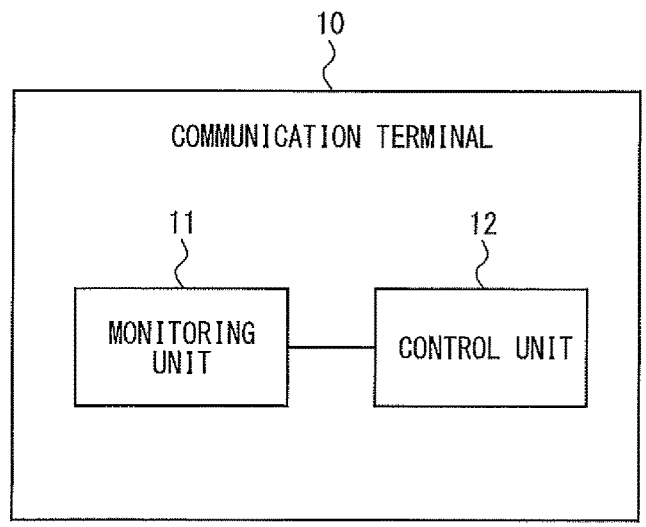
FIG. 1 is a schematic diagram of a communication terminal according to a first exemplary embodiment.

Exemplary embodiments of the present invention are described hereinafter with reference to the drawings. First, a configuration example of a communication terminal 10 according to a first exemplary embodiment of the present invention is described with reference to FIG. 1. The communication terminal 10 may be a computer device that operates by running, on a processor, a program stored in a memory. The communication terminal 10 may be a mobile phone terminal, a smartphone, a tablet terminal or the like, and it may be a UE, which is used as a general term for communication terminals in the 3GPP.

The communication terminal 10 includes a monitoring unit 11 and a control unit 12. The elements of the communication terminal 10 such as the monitoring unit 11 and the control unit 12 may be software, a module or the like whose processing is executed by running, on a processor, a program stored in a memory. Further, the elements of the communication terminal 10 may be hardware such as a circuit or a chip.

The monitoring unit 11 monitors the control information containing the allocation information of at least one subframe in which downlink data is transmitted. The downlink data is data that is transmitted from a base station to the communication terminal 10. The downlink data may be U-Plane data, user data or the like.

Subframes are radio resources divided into specific time slots. For example, in the 3GPP, a subframe is divided into 1-millisecond time periods. Downlink data addressed to the communication terminal 10 is transmitted from a base station by using one or more subframes. The allocation information contains information for identifying a subframe in which downlink data addressed to the communication terminal 10 is transmitted. In the case where downlink data is transmitted by multi-subframe scheduling, the allocation information contains information about a plurality of subframes in which downlink data is transmitted.

The control information containing the allocation information may be transmitted using a subframe that is the same as a subframe in which downlink data is transmitted, or may be transmitted using a subframe that is different from a subframe in which downlink data is transmitted. The control information may be C-Plane data.

Monitoring the control information means decoding the control information that is possibly addressed to the communication terminal 10.

The control unit 12 determines monitoring timing to perform monitoring of the control information in accordance with a decoding result of downlink data transmitted using at least one subframe. The downlink data is decoded for each subframe specified by the allocation information. The decoding result is information indicating whether downlink data has been decoded normally or not for each subframe.

After the monitoring unit 11 receives downlink data in all subframes specified by the received allocation information, the monitoring unit 11 needs to monitor the control information containing the next allocation information in order to continuously receive downlink data. Thus, the control unit 12 determines the timing for the monitoring unit 11 to monitor the control information containing the next allocation information in accordance with a decoding result of downlink data.

For example, when a decoding result of downlink data exhibits a favorable tendency, the control unit 12 may determine to monitor the control information containing the next allocation information after receiving downlink data in all subframes specified by the allocation information. On the other hand, when a decoding result of downlink data exhibits an unfavorable tendency, the control unit 12 may determine to change the monitoring timing so as to monitor the control information containing the next allocation information before receiving downlink data in all subframes specified by the allocation information. The monitoring unit 11 carries out monitoring of the control information at the monitoring timing determined by the control unit 12.

As described above, the monitoring unit 11 of the communication terminal 10 does not need to monitor all subframes when monitoring the control information, and it can monitor the control information at the monitoring timing determined in accordance with a decoding result of downlink data. The communication terminal 10 can thereby reduce the number of times to monitor the control information compared with the case of monitoring the control information transmitted in all subframes. It is thus possible to prevent an increase in power consumption of the communication terminal 10 compared with the case of monitoring the control information transmitted in all subframes.

Second Exemplary Embodiment

Figure 2:
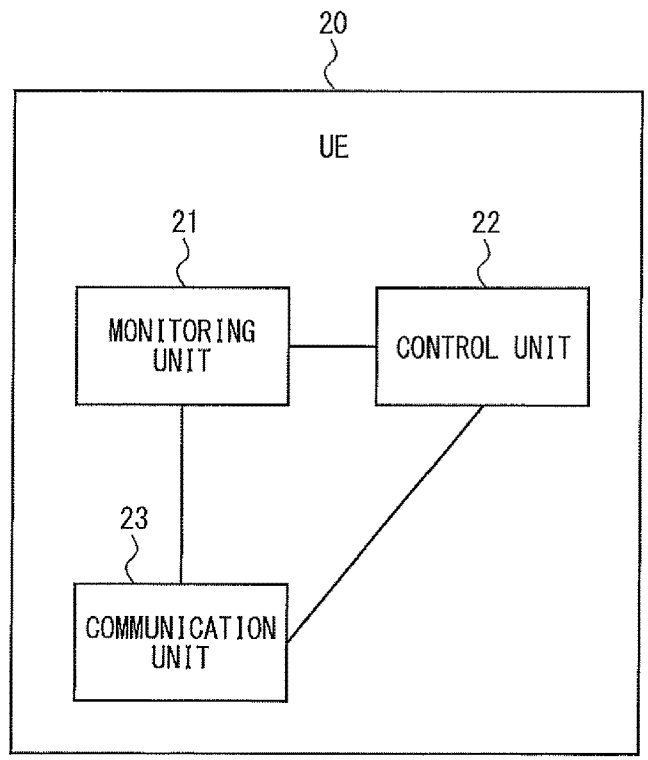
FIG. 2 is a schematic diagram of a UE according to a second exemplary embodiment.

Next, a configuration example of a UE 20 according to a second exemplary embodiment of the present invention is described with reference to FIG. 2. The UE 20 corresponds to the communication terminal 10 in FIG. 1. The UE 20 includes a monitoring unit 21, a control unit 22, and a communication unit 23. The monitoring unit 21 corresponds to the monitoring unit 11 in FIG. 1, and the control unit 22 corresponds to the control unit 12 in FIG. 1. The functions and operations of the monitoring unit 21 and the control unit 22 which are common to those in FIG. 1 are not redundantly described in detail below.

The monitoring unit 21 monitors the PDCCH that delivers the control information and thereby obtains scheduling information regarding multi-subframe scheduling. The scheduling information corresponds to the allocation information. In multi-subframe scheduling, one scheduling information item indicates one or more subframes that are allocated to the UE 20 in an arbitrary period. The period may be set to 2 milliseconds, 4 milliseconds, 8 milliseconds, 16 milliseconds or the like, for example. The number of subframes in one period may vary in accordance with a specified period.

The control information that is delivered through the PDCCH is defined as DCI, and further a format for setting the DCI is defined as a DCI format. The monitoring unit 21 detects the DCI format by decoding the PDCCH. The monitoring unit 21 can obtain the scheduling information by detecting the DCI format related to multi-subframe scheduling. In the scheduling information, a subframe number to be used by, for example, the UE 20 is specified. Alternatively, in the case where the UE 20 has setting information (multi-subframe scheduling configuration) related to multi-subframe scheduling, the allocation information may contain radio resource specification information that specifies which of candidate radio resources indicated by the setting information is to be used. The setting information related to multi-subframe scheduling may, for example, be information containing a subframe number or a subframe pattern to be used and an Index associated with the number or pattern. In this case, the radio resource specification information may be information containing the Index. The setting information related to multi-subframe scheduling may be transmitted through an RRC message (e.g., RRC Connection Reconfiguration message) that is used when establishing an RRC (Radio Resource Control) connection between the UE 20 and the eNB 30.

When the monitoring unit 21 obtains the scheduling information, that is, when the monitoring unit 21 detects the DCI format to which the scheduling information is set, it stops monitoring of the PDCCH until the next period. The next period is a period that follows a period where scheduling of subframes related to the UE 20 is carried out.

The communication unit 23 receives downlink data that is transmitted using the subframe specified in the scheduling information. The downlink data is delivered through the PDSCH. Further, the communication unit 23 decodes the received downlink data. The communication unit 23 receives downlink data that is transmitted from the eNB 30. For example, the communication unit 23 transmits and receives data to and from the eNB 30 by performing LTE (Long Term Evolution) communication with the eNB 30. The eNB 30 is described in detail later.

The control unit 22 determines whether downlink data has been decoded normally in the subframe specified in the scheduling information. When the downlink data has been decoded normally, the control unit 22 transmits ACK to the eNB 30 via the communication unit 23. When, on the other hand, the downlink data has not been decoded normally, the control unit 22 transmits NACK to the eNB 30 via the communication unit 23. Further, the control unit 22 may also transmit NACK to the eNB 30 via the communication unit 23 when downlink data is not transmitted using the subframe specified in the scheduling information.

The control unit 22 counts the number of times NACK is transmitted. Further, the control unit 22 compares the number of NACK transmission times with an arbitrary threshold. Information (counter) about counting the number of NACK transmission times and the threshold may be stored in a memory or the like. The control unit 22 determines the timing to monitor the PDCCH in accordance with a result of a comparison made between the number of NACK transmission times and the threshold. As the threshold, a natural number may be set, and it may be the percentage with respect to the number of subframes determined by the period. For example, the case where the threshold is set to 20% in the condition where 10 subframes are contained in one period means the same as the case where 2 is set as the threshold. Further, the control unit 22 may compare the percentage of the number of NACK transmission times with respect to the number of response signals transmitted to the eNB 30 with a threshold indicating a percentage. The number of response signals transmitted to the eNB 30 is the sum of the number of times ACK is transmitted and the number of times NACK is transmitted. Alternatively, the control unit 22 may compare the number of times ACK is transmitted or the proportion of the number of times ACK is transmitted with respect to the number of response signals transmitted to the eNB 30 with an arbitrary threshold.

For example, when the control unit 22 determines that the number of NACK transmission times reaches a threshold or the number of NACK transmission times exceeds a threshold, the control unit 22 may decide to resume monitoring of the PDCCH in the monitoring unit 21 from a subframe that follows the last subframe where downlink data that has failed to be decoded normally has been transmitted. The last subframe where downlink data that has failed to be decoded normally has been transmitted is, in other words, the subframe that has caused NACK to be transmitted last time. The control unit 22 outputs information related to the timing or subframe to resume monitoring of the PDCCH to the monitoring unit 21. Alternatively, when the UE 20 determines that the number of NACK transmission times reaches a threshold or the number of NACK transmission times exceeds a threshold in a subframe #n, it may resume monitoring of the PDCCH in a subframe #n+m. In this case, the control unit 22 may output the subframe #n+m as the timing to resume monitoring of the PDCCH to the monitoring unit 21, for example. m may be defined as specifications in advance, or it may be notified from the eNB 30 to the UE 20 by an RRC message.

The control unit 22 can decide to monitor the PDCCH in an adaptive manner. To monitor the PDCCH in an adaptive manner may be to start, resume or suspend monitoring of the PDCCH that is transmitted at least in a specific DCI format. The specific DCI format is a DCI format for multi-subframe scheduling, for example. Alternatively, to monitor the PDCCH in an adaptive manner may be to start, resume or suspend monitoring of the PDCCH that is masked (scrambled) at least by a specific RNTI (Radio Network Temporary Identifier). The specific RNTI is RNTI for multi-subframe scheduling (MS-RNTI), for example.

Generally, the PDCCH is masked by using C-RNTI that is individualized for UE, RNTI that is used for the PDCCH for a specific DCI format or the like. The RNTI that is used for the PDCCH for a specific DCI format may be SI-RNTI for System Information, for example. This allows only the UE that should receive the PDCCH to detect a DCI format correctly.

The monitoring unit 21 resumes monitoring of the PDCCH in the timing or subframe specified by the control unit 22.

Figure 3:
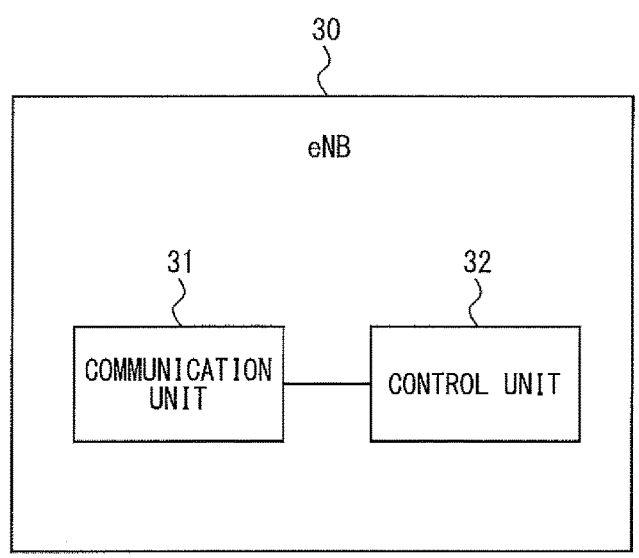
FIG. 3 is a schematic diagram of an eNB according to the second exemplary embodiment.

A configuration example of the eNB 30 according to a second exemplary embodiment of the present invention is described hereinafter with reference to FIG. 3. The eNB 30 is defined as a base station that supports LTE communication in the 3GPP. The eNB 30 includes a communication unit 31 and a control unit 32. The elements that constitute the eNB 30 may be software, a module or the like that operates by running, on a processor, a program stored in a memory. Alternatively, the elements that constitute the eNB 30 may be hardware such as a circuit or a chip.

The control unit 32 performs scheduling that allocates radio resources to UEs located in a communication area formed by the eNB 30. To be specific, the control unit 32 decides subframes to be allocated to each UE. Further, when performing multi-subframe scheduling for the UE 20, the control unit 32 sets, to one PDCCH, the scheduling information regarding a plurality of subframes allocated to the UE. The control unit 32 transmits the PDCCH to which the scheduling information is set to the UE 20 via the communication unit 31.

Further, the control unit 32 transmits downlink data addressed to the UE 20 via the communication unit 31 by using the subframe allocated to the UE 20.

Further, the control unit 32 receives ACK and NACK from the UE 20 via the communication unit 31. Further, the control unit 32 counts the number of NACKs transmitted from the UE 20. Furthermore, the control unit 32 compares the number of NACKs with an arbitrary threshold. Information (counter) about counting the number of NACKs and the threshold may be stored in a memory or the like. The control unit 32 changes scheduling regarding the UE 20 in accordance with a result of a comparison made between the number of NACKs and the threshold. Further, the control unit 32 transmits the changed scheduling information through the PDCCH to the UE 20 via the communication unit 31.

The threshold to be compared with the number of NACKs is the same value as the threshold to be compared with the number of NACK transmission times in the UE 20. It is thereby possible to allow the timing that the UE 20 resumes monitoring of the PDCCH to coincide with the timing that the control unit 32 changes scheduling regarding the UE 20 and transmits the changed scheduling information to the UE 20 through the PDCCH.

Thus, the control unit 32 may transmit information about a threshold to be used in the eNB 30 to the UE 20 via the communication unit 31. For example, the communication unit 31 may set information about a threshold to the PDCCH to be transmitted to the UE 20. Alternatively, the communication unit 31 may set information about a threshold to an RRC message to be used when establishing an RRC connection between the UE 20 and the eNB 30. Alternatively, the communication unit 31 may set information about a threshold to annunciation information to be transmitted to a plurality of UEs located in a communication area formed by the eNB 30. Alternatively, information about a threshold may be set in advance as a default value in each of the UE 20 and the eNB 30.

When the number of NACKs reaches a threshold or the number of NACKs exceeds a threshold, for example, the control unit 32 may switch scheduling for the UE 20 to dynamic scheduling. In the case where the number of NACKs reaches a threshold or the number of NACKs exceeds a threshold, it is assumed that the quality of the wireless communication environment between the eNB 30 and the UE 20 is degraded. Thus, in such a case, dynamic scheduling may be carried out for the UE 20 so as to control a modulation level, a code rate or the like for each subframe and improve the throughput between the UE 20 and the eNB 30.

Further, when the number of NACKs reaches a threshold or the number of NACKs exceeds a threshold, for example, the control unit 32 may set a period in multi-subframe scheduling to be shorter than the previous period. By shortening a period in multi-subframe scheduling, it is possible to increase the chance to change a modulation level, a code rate or the like. The throughput between the UE 20 and the eNB 30 may be improved in this manner.

Further, when the number of NACKs does not reach a threshold or the number of NACKs does not exceed a threshold within one period, for example, the control unit 32 may set a next period in multi-subframe scheduling to be longer. In the case where the number of NACKs does not reach a threshold or the number of NACKs does not exceed a threshold, it is assumed that the quality of the wireless communication environment between the eNB 30 and the UE 20 is high enough. Thus, by elongating a period in multi-subframe scheduling, it is possible to increase the subframes allocated to the UE 20 and further improve the throughput between the UE 20 and the eNB 30.

Further, the control unit 32 retransmits, in the next period, downlink data that has been transmitted in the subframe that has caused NACK to be transmitted. In the UE 20 and the eNB 30, NACK related to downlink data that is retransmitted (retransmission NACK) and NACK related to downlink data that is transmitted for the first time (initial NACK) may be counted separately from each other. Further, different thresholds may be set for the retransmission NACK and the initial NACK.

For example, in the case of allowing a decrease in throughput to a certain degree by retransmission of downlink data, only the number of retransmission NACKs may be counted, and the scheduling information may be changed when the counter value reaches a threshold. On the other hand, in the case of suppressing a decrease in throughput, the number of initial NACKs may be counted, and the scheduling information may be changed when the counter value reaches a threshold.

Figure 4:
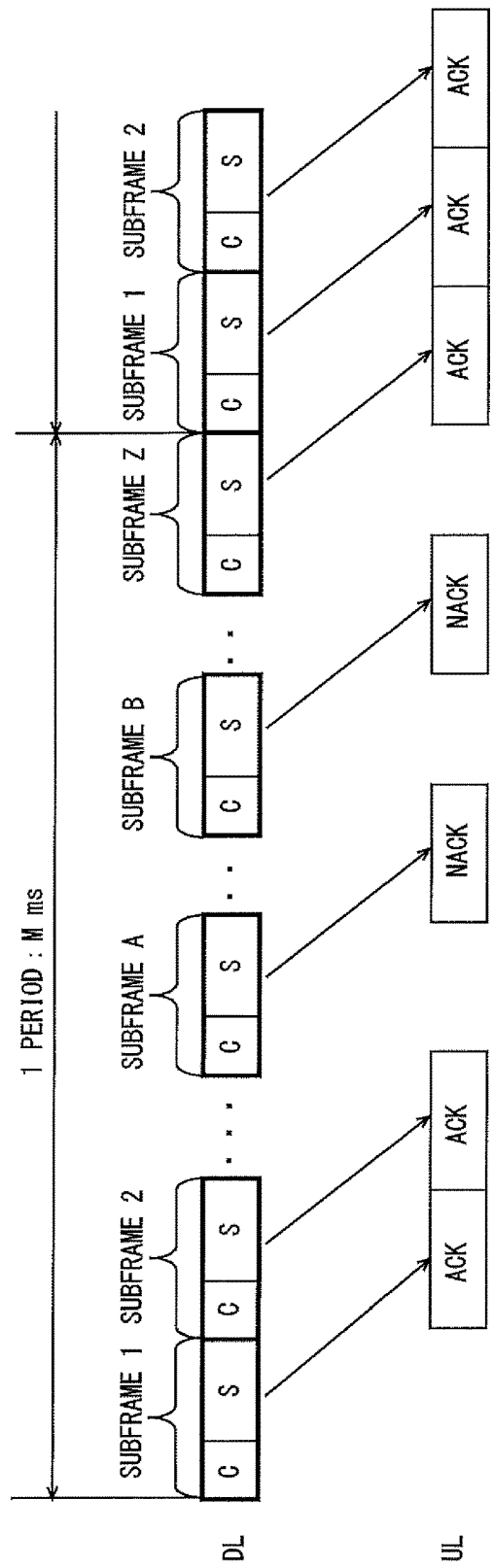
FIG. 4 is a view illustrating an operation in a UE according to the second exemplary embodiment.

The operation in the UE 20 is described hereinafter with reference to FIG. 4. FIG. 4 shows that subframes 1 to Z in one period, which is M milliseconds, are allocated in DL (Down Link) in the UE 20. The M milliseconds may be set to 2 milliseconds, 4 milliseconds, 8 milliseconds, 16 milliseconds or the like, for example. Further, "C" in a subframe indicates the PDCCH, and "S" indicates the PDSCH. As shown in FIG. 4, a PDCCH region exists in all subframes.

For example, the UE 20 receives the scheduling information in the PDCCH transmitted in the subframe 1.

Further, the UE 20 transmits ACK or NACK indicating whether downlink data set to the PDSCH has been decoded normally or not in UL (Up Link). For example, in the case where a threshold is set to 2, the number of NACK transmission times reaches the threshold when the UE 20 transmits NACK to the eNB 30 as a decoding result in the subframe B. In this case, the UE 20 resumes monitoring of the PDCCH in the subframe that follows the subframe B.

The UE 20 clears the counter of the number of NACK transmission times when the number of NACK transmission times reaches the threshold in one period or when one period expires.

Further, the eNB 30 may set the changed scheduling information regarding the UE 20 to the PDCCH in the subframe that follows the subframe B.

Figure 5:
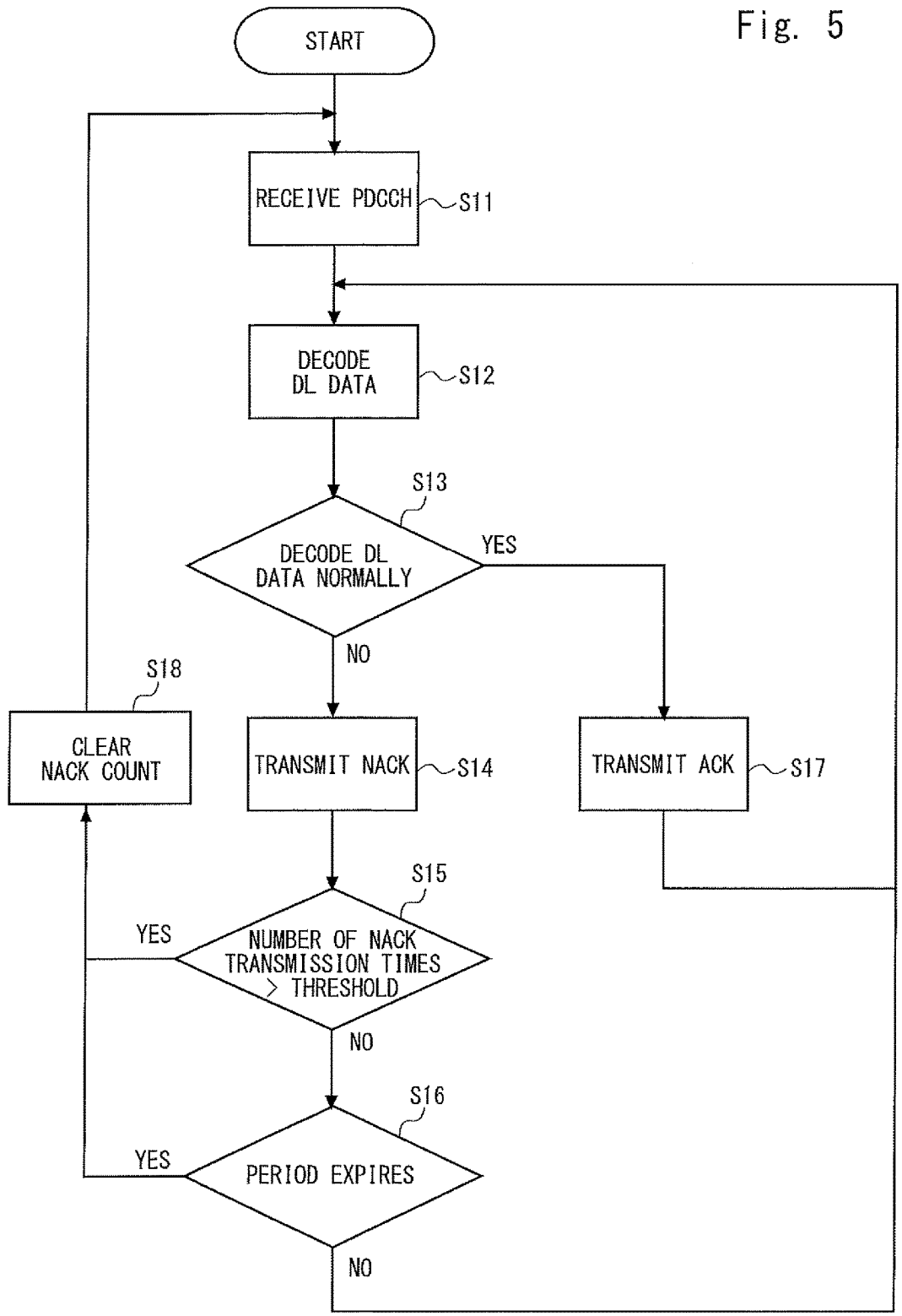
FIG. 5 is a view showing a flow of a process related to determining PDCCH monitoring timing in a UE according to the second exemplary embodiment.

The flow of a process related to determining the PDCCH monitoring timing in the UE 20 according to the second exemplary embodiment of the present invention is described hereinafter with reference to FIG. 5.

First, the monitoring unit 21 receives the PDCCH and detects a DCI format for multi-subframe scheduling (S11). It is assumed that the scheduling information in multi-subframe scheduling is set to the DCI format for multi-subframe scheduling. When the monitoring unit 21 detects the DCI format for multi-subframe scheduling, the monitoring unit 21 stops monitoring of the PDCCH. Next, the communication unit 23 decodes the downlink data transmitted using the subframe specified in the scheduling information (S12).

Then, the control unit 22 determines whether the downlink data has been decoded normally or not (S13). For example, the control unit 22 may determine the normality of the decoded downlink data by CRC (Cyclic Redundancy Check) check or the like. The control unit 22 may determine the normality of the downlink data by using a method other than CRC check.

When the control unit 22 determines that the downlink data has not been decoded normally, it transmits NACK to the eNB 30 via the communication unit 23 (S14). Next, the control unit 22 determines whether the number of NACK transmission times exceeds a threshold or not (S15). Alternatively, the control unit 22 may determine whether the number of NACK transmission times reaches a threshold or not. When the control unit 22 transmits NACK, it increments the counter of the number of NACK transmission times stored in a memory or the like by one. When the control unit 22 determines that the number of NACK transmission times does not exceed a threshold, the control unit 22 determines whether the period of multi-subframe scheduling has expired or not (S16).

When the control unit 22 determines that the period of multi-subframe scheduling has not expired, it repeats the process after Step S12.

When the control unit 22 determines in Step S15 that the number of NACK transmission times exceeds a threshold, or when the control unit 22 determines in Step S16 that the period of multi-subframe scheduling has expired, it clears the counter of the number of NACK transmission times (S18).

After that, the monitoring unit 21 repeats the process after Step S11 that monitors the PDCCH and detects the PDCCH.

In Step S13, when the control unit 22 determines that the downlink data has been decoded normally, it transmits ACK to the eNB 30 via the communication unit 23 (S17). Then, the communication unit 23 repeats the process after Step S12 that decodes the downlink data transmitted using the subframe specified in the scheduling information.

Figure 6:
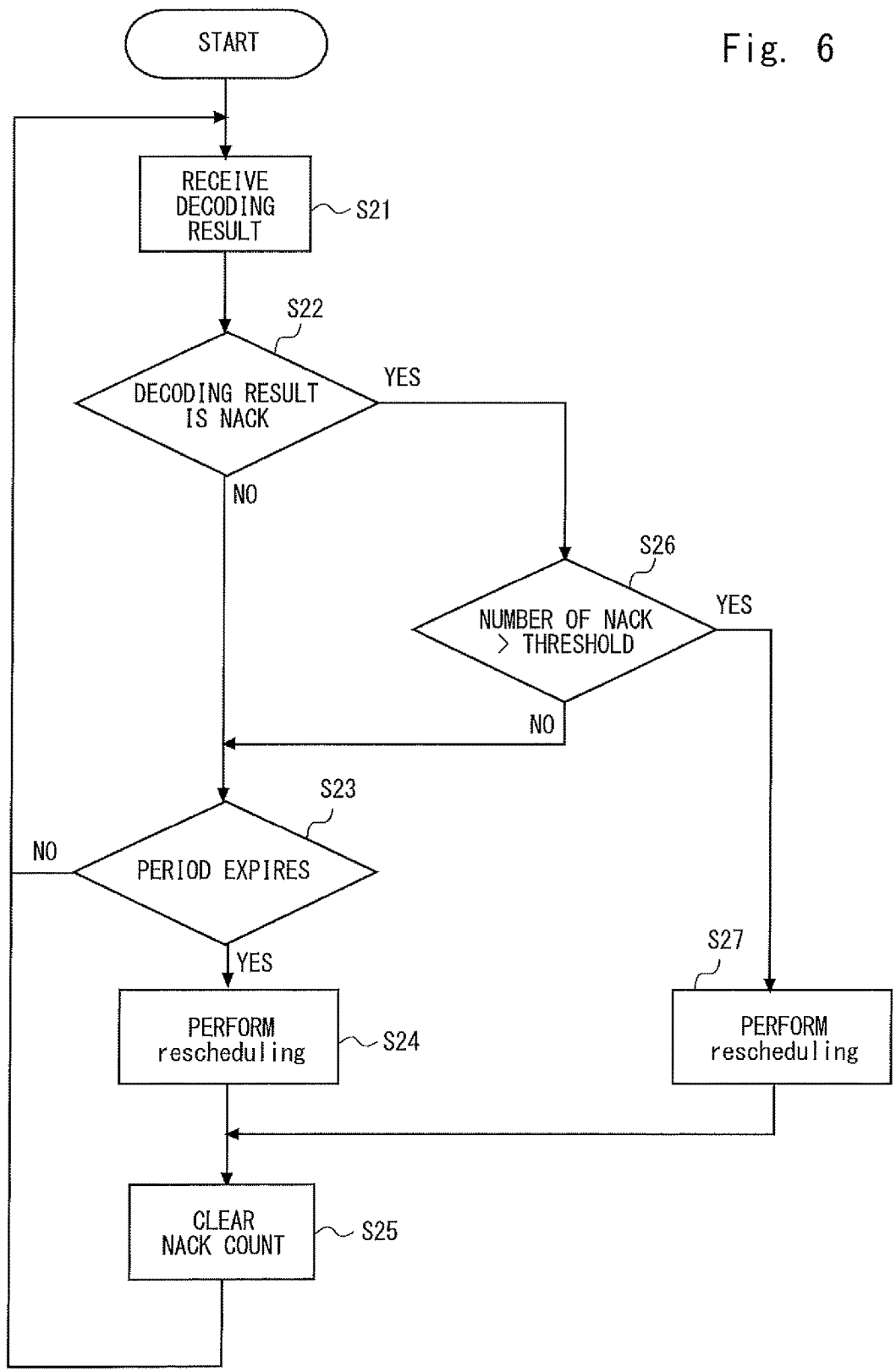
FIG. 6 is a view showing a flow of a process related to changing scheduling information in an eNB according to the second exemplary embodiment.

The flow of a process related to changing the scheduling information in the eNB 30 according to the second exemplary embodiment of the present invention is described hereinafter with reference to FIG. 6. First, the communication unit 31 receives information about a decoding result transmitted from the UE 20 (S21).

Next, the control unit 32 determines whether the decoding result transmitted from the UE 20 is NACK or not (S22). When the control unit 32 determines that the decoding result is not NACK, i.e., it is ACK, the control unit 32 determines whether the period of multi-subframe scheduling regarding the UE 20 has expired or not (S23).

When the control unit 32 determines that the period of multi-subframe scheduling regarding the UE 20 has expired, it changes the scheduling information of multi-subframe scheduling regarding the UE 20 (rescheduling) (S24). For example, in Step S24, the control unit 32 may estimate that the wireless communication environment between the eNB 30 and the UE 20 is good and change the scheduling information so as to elongate the next period in multi-subframe scheduling. Then, the control unit 32 clears the counter of the number of NACKs (S25).

When, in Step S22, the control unit 32 determines that the decoding result is NACK, it determines whether the number of received NACKs exceeds a threshold or not (S26). When the control unit 32 receives NACK, it increments the counter of the number of received NACKs stored in a memory or the like by one. When the control unit 32 determines that the number of received NACKs does not exceed a threshold, it performs the process after Step S23.

When, in Step S26, the control unit 32 determines that the number of received NACKs exceeds a threshold, it changes the scheduling information of multi-subframe scheduling regarding the UE 20 (rescheduling) (S27). For example, in Step S27, the control unit 32 may estimate that the wireless communication environment between the eNB 30 and the UE 20 is degraded and switch scheduling for the UE 20 to dynamic scheduling. Then, the process after Step S25 is repeated.

As described above, the UE 20 according to the second exemplary embodiment of the present invention can decide the timing to monitor the PDCCH in accordance with the number of NACK transmission times in the state where it is operating according to multi-subframe scheduling. Thus, when the number of NACK transmission times increases and the wireless communication environment with the eNB 30 is degraded, the UE 20 can monitor and detect the PDCCH to which new scheduling information is set. In the newly detected PDCCH, the scheduling information in consideration of degradation of the wireless communication environment is set. Therefore, the UE 20 can improve the throughput by operating in accordance with the new scheduling information.

Further, after detecting the PDCCH related to multi-subframe scheduling, the UE 20 stops monitoring of the PDCCH until the period of multi-subframe scheduling expires. Alternatively, after detecting the PDCCH related to multi-subframe scheduling, the UE 20 stops monitoring of the PDCCH until the number of NACK transmission times reaches a threshold. It is thereby possible to suppress an increase in power consumption of the UE 20 compared with the case of monitoring the PDCCH in all subframes.

Further, when the number of NACKs transmitted from the UE 20 exceeds a threshold, the eNB 30 can change the scheduling information regarding the UE 20. Specifically, when the wireless communication environment with the UE 20 is degraded, the eNB 30 can change the scheduling information so as to improve the throughput in the communication with the UE 20 by shortening the period of multi-subframe scheduling or changing a modulation level, a code rate or the like.

Furthermore, even when the number of NACKs does not exceed a threshold, the eNB 30 can further improve the throughput of the UE 20 by elongating the period of multi-subframe scheduling.

In addition, since the eNB 30 and the UE 20 use the same threshold, it is possible to make the timing when the eNB 30 changes the scheduling information and the timing when the UE 20 resumes monitoring of the PDCCH coincide with each other.

Third Exemplary Embodiment

Figure 7:
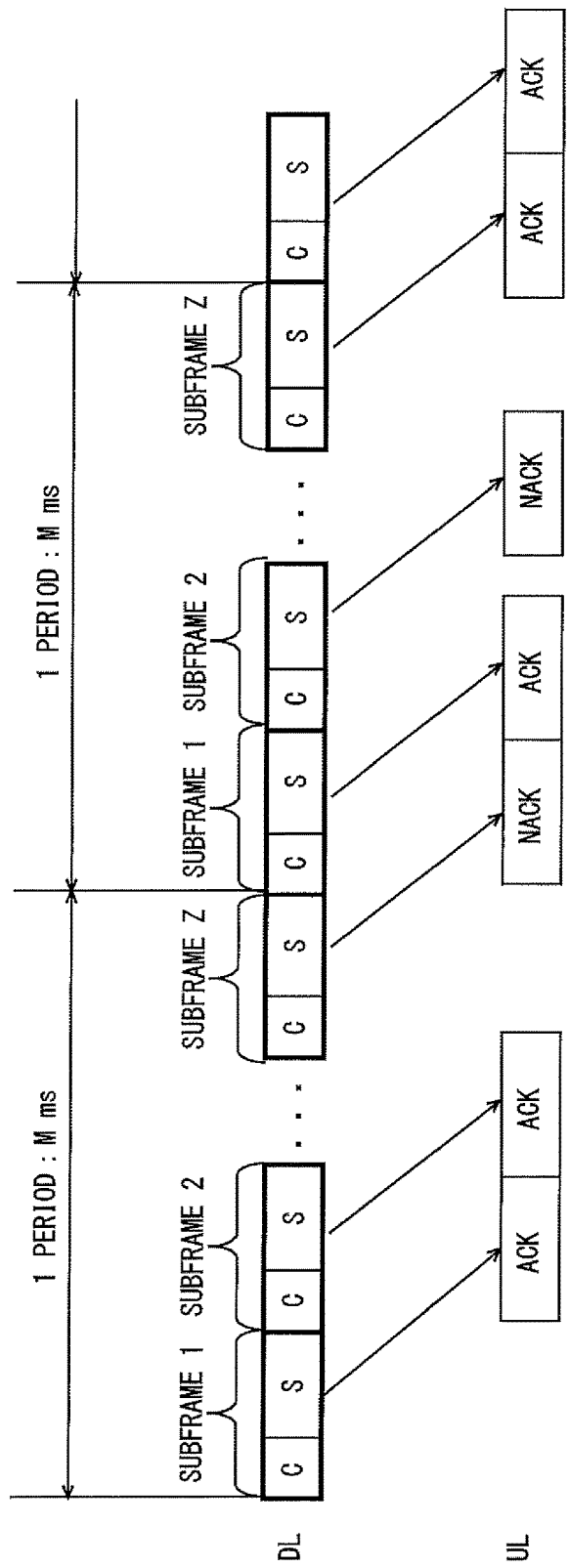
FIG. 7 is a view illustrating an operation in a UE according to a third exemplary embodiment.

The operation in the UE 20 according to a third exemplary embodiment of the present invention is described hereinafter with reference to FIG. 7. FIG. 7 shows that the UE 20 counts the number of NACK transmission times over two periods. For example, in the case where a threshold is set to 2, the number of NACK transmission times reaches the threshold when the UE 20 transmits NACK to the eNB 30 as a decoding result in the subframe 2 in the second period. In this case, the UE 20 resumes monitoring of the PDCCH in the subframe that follows the subframe 2 in the second period.

Further, the eNB 30 may set the changed scheduling information regarding the UE 20 to the PDCCH in the subframe that follows the subframe 2 in the second period.

When the number of NACK transmission times reaches the threshold, the UE 20 clears the counter of the number of NACK transmission times. In FIG. 7, when the number of NACK transmission times does not reach the threshold in the first period, the UE 20 maintains the value of the counter, without clearing the counter, also in the following period.

Figure 8:
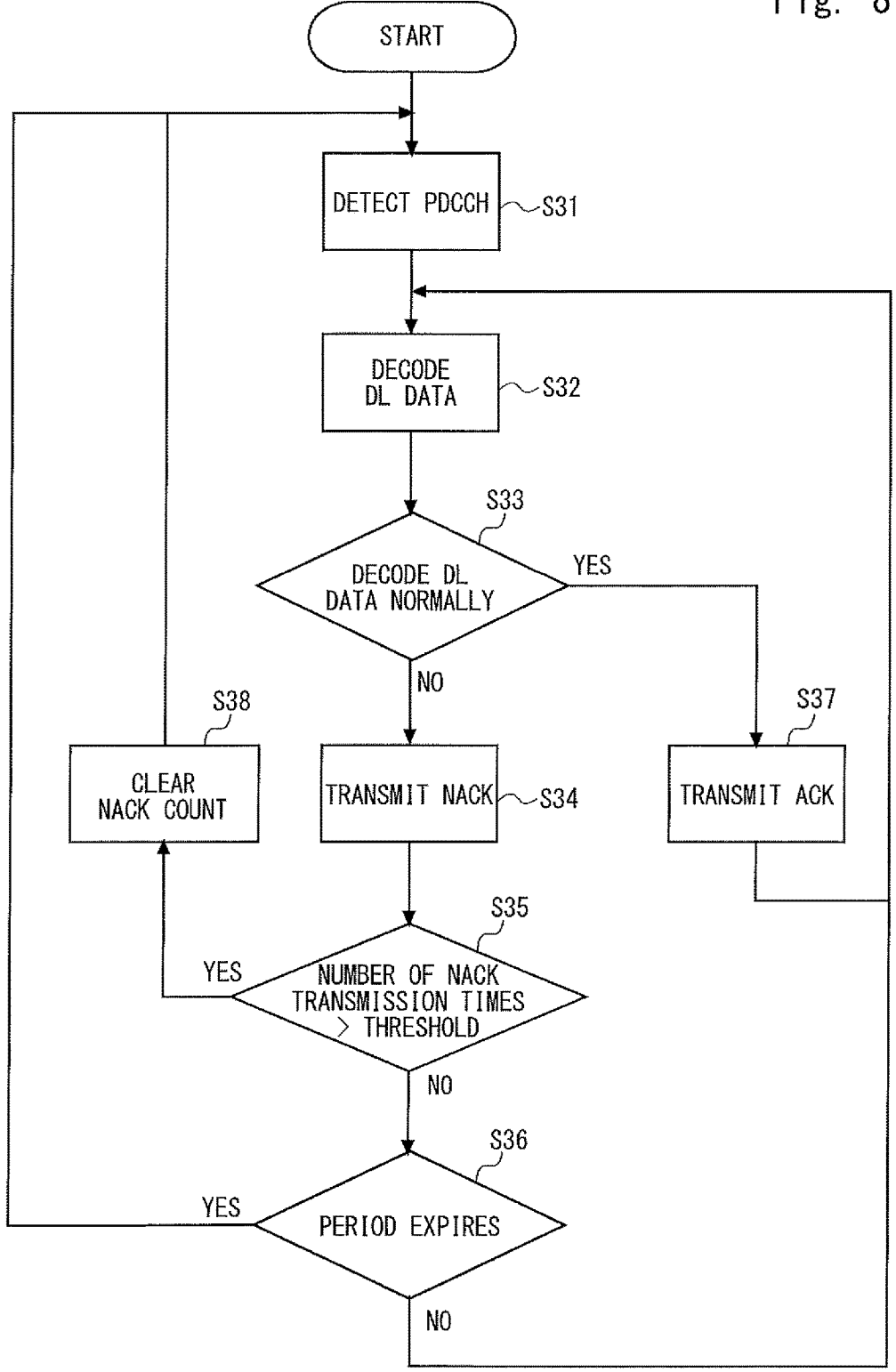
FIG. 8 is a view showing a flow of a process related to determining PDCCH monitoring timing in a UE according to the third exemplary embodiment.

The flow of a process related to determining the PDCCH monitoring timing in the UE 20 according to the third exemplary embodiment of the present invention is described hereinafter with reference to FIG. 8. Steps S31 to S35 and S37 are the same as Steps S11 to S15 and S17 in FIG. 5 and not redundantly described in detail.

In Step S35, when the control unit 22 determines that the number of NACK transmission times does not exceed a threshold, it determines whether the period of multi-subframe scheduling has expired or not (S36).

When the control unit 22 determines that the period of multi-subframe scheduling has not expired, it repeats the process after Step S32. When, on the other hand, the control unit 22 determines that the period of multi-subframe scheduling has expired, it repeats the process after Step S31. The process in FIG. 8 is different from the process in FIG. 5 in that when the control unit 22 determines that the period of multi-subframe scheduling has expired, the process after Step S31 is repeated without clearing the counter of the number of NACKs.

Figure 9:
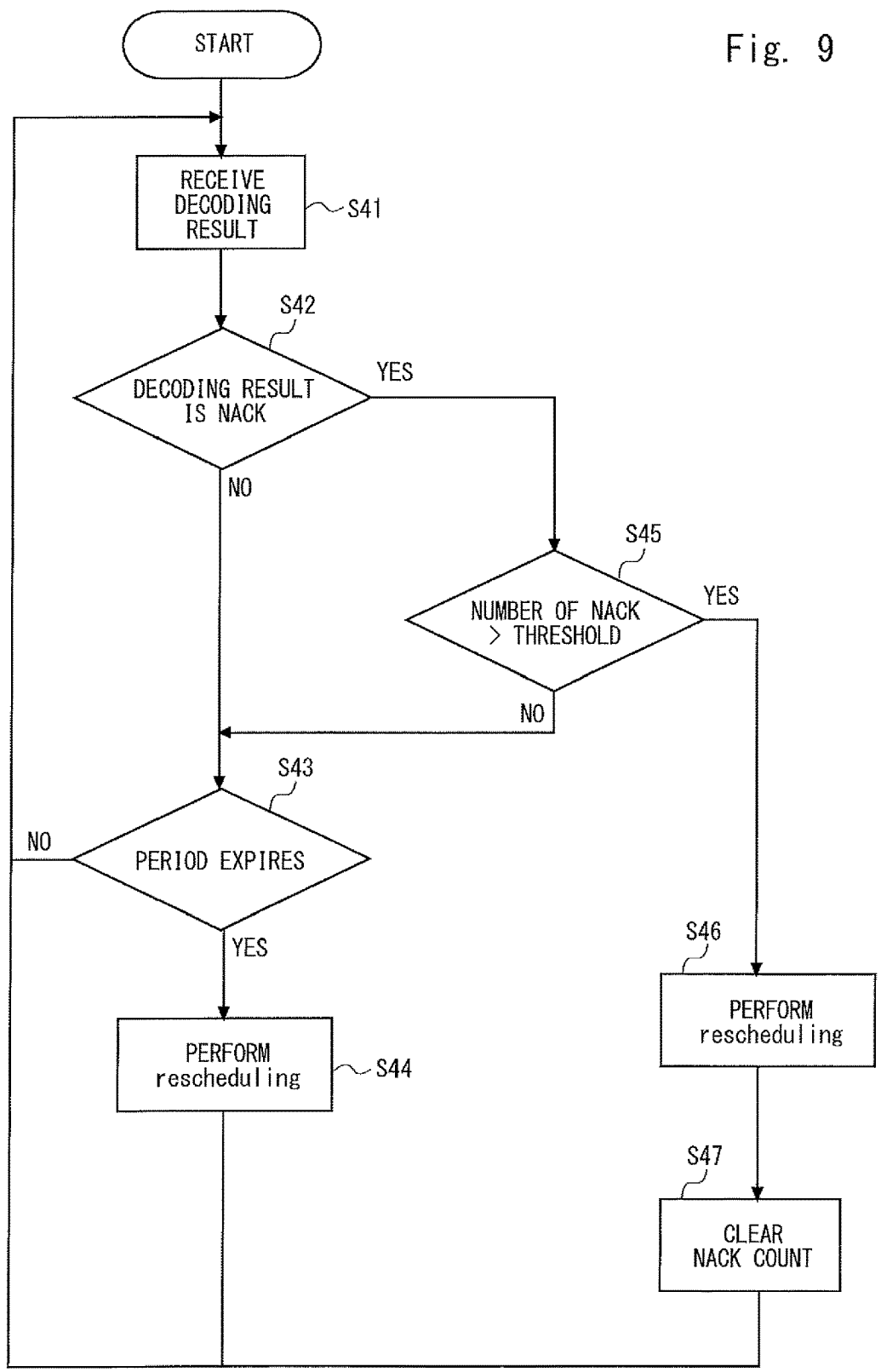
FIG. 9 is a view showing a flow of a process related to changing scheduling information in an eNB according to the third exemplary embodiment.

The flow of a process related to changing the scheduling information in the eNB 30 according to the third exemplary embodiment of the present invention is described hereinafter with reference to FIG. 9. Steps S41 to S43 and S45 are the same as Steps S21 to S23 and S25 in FIG. 6 and not redundantly described in detail.

In Step S44, when the control unit 32 determines that the period of multi-subframe scheduling regarding the UE 20 has expired, it changes the scheduling information of multi-subframe scheduling regarding the UE 20 (rescheduling) (S44). Then, when the scheduling information is changed by expiration of the period of multi-subframe scheduling, the process after Step S41 is repeated without clearing the counter of the number of NACKs.

In Step S45, when the control unit 32 determines that the number of received NACKs exceeds a threshold, it changes the scheduling information of multi-subframe scheduling regarding the UE 20 (rescheduling) (S46). Then, when the scheduling information is changed by exceeding of the number of received NACKs, the control unit 32 repeats the process after Step S41 after clearing the counter of the number of NACKs (S47).

As described above, by executing the operation in the UE 20 and the eNB 30 according to the third exemplary embodiment of the present invention, it is possible to count the number of NACK transmission times over a plurality of periods. It is thereby possible to reduce the process of clearing the counter of the number of NACK transmission times compared with the second exemplary embodiment, and it is possible to reduce the processing load of the UE 20 and the eNB 30.

Fourth Exemplary Embodiment

The flow of a trigger signal transmitting process according to a fourth exemplary embodiment of the present invention is described hereinafter with reference to FIG. 10. Prior to describing the flow of the process in FIG. 10, the trigger signal is described hereinafter.

In the second and third exemplary embodiments, the case where the UE 20 counts the number of NACK transmission times and the eNB 30 counts the number of NACK reception times is described. In the fourth exemplary embodiment, when only the UE 20 counts the number of NACK transmission times and, when the number of NACK transmission times reaches a threshold or exceeds a threshold, the UE transmits a trigger signal to the eNB 30. For example, a special NACK indicating that the number of NACK transmission times has reached a threshold or exceeded a threshold may be transmitted. Specifically, the trigger signal is used for the UE 20 to notify the eNB 30 of the condition related to the number of NACK transmission times. The radio resource for transmitting the trigger signal (e.g., special NACK) may be notified (or set) to the UE 20 in advance. Alternatively, when the UE 20 acquires the uplink radio resource (i.e., scheduling is done), it may transmit the trigger signal by this radio resource. Note that the uplink radio resource may be at least any one of the PDCCH and the PDSCH, for example.

Further, a threshold that is used for determination of the timing to transmit the trigger signal may be notified from the eNB 30. For example, the eNB 30 may set information related to a threshold to the PDCCH to be transmitted to the UE 20. Alternatively, the eNB 30 may set information related to a threshold to an RRC message that is used when establishing an RRC connection between the UE 20 and the eNB 30. Alternatively, the eNB 30 may set information related to a threshold to annunciation information that is transmitted to a plurality of UEs located in a communication area formed by the eNB 30. Alternatively, information related to a threshold may be set in advance as a default value in each of the UE 20 and the eNB 30.

Figure 10:
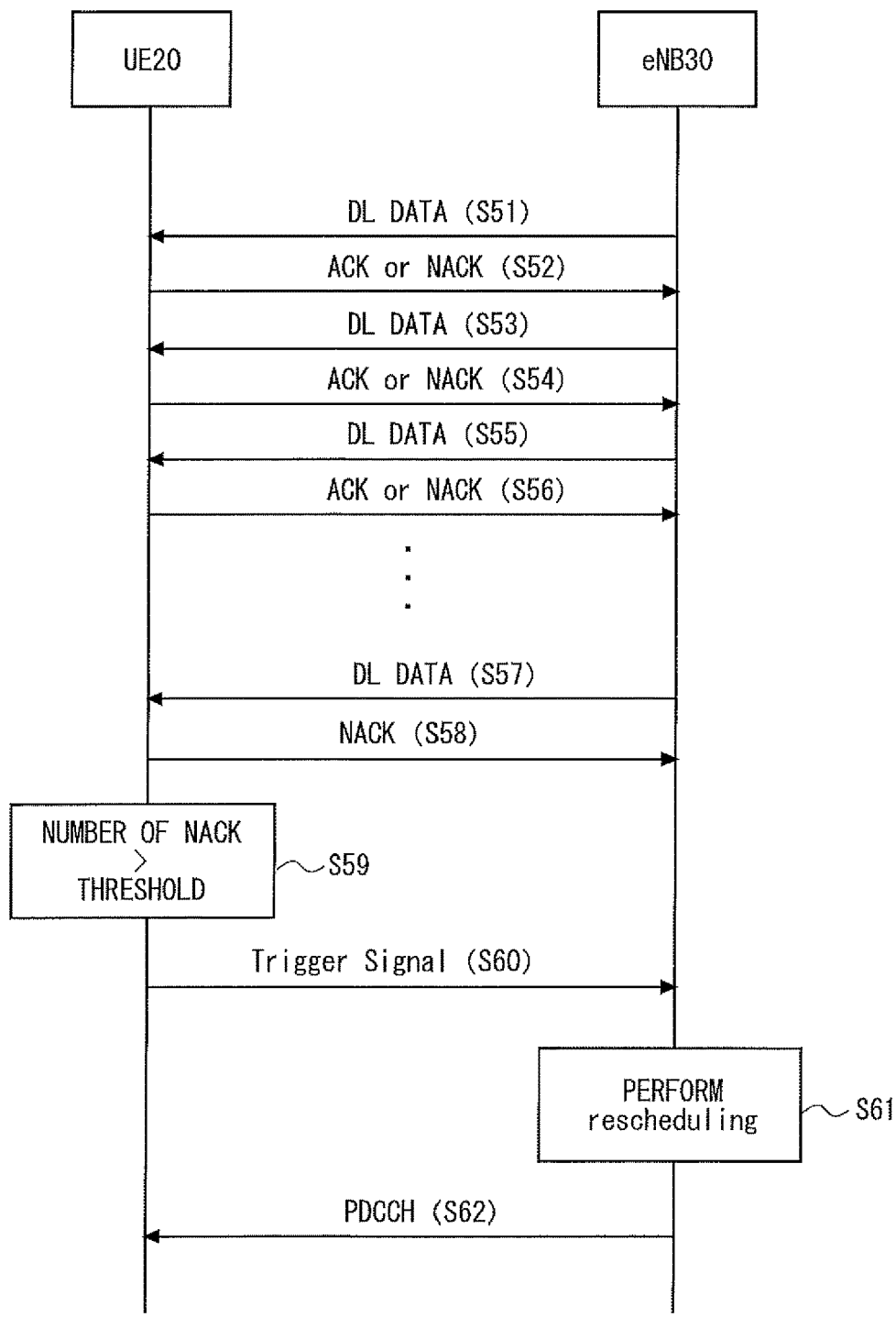
FIG. 10 is a view showing a flow of a trigger signal transmitting process according to a fourth exemplary embodiment.

The flow of a process in FIG. 10 is described hereinbelow. First, the eNB 30 transmits downlink data by using the subframe allocated to the UE 20 (S51). Next, the UE 20 transmits, to the eNB 30, ACK or NACK indicating whether the downlink data transmitted in Step S51 has been decoded normally or not (S52). In Steps S53 to S56 also, the same processing as in Steps S51 and S52 is repeated.

Then, the UE 20 determines that the downlink data transmitted in Step S57 has not been decoded normally, and it transmits NACK (S58). By NACK transmitted in Steps S58, the UE 20 determines that the number of NACK transmission times exceeds an arbitrary threshold (S59). The UE 20 then transmits the trigger signal to the eNB 30 (S60).

When the eNB 30 receives the trigger signal transmitted from the UE 20, it changes the scheduling information of multi-subframe scheduling regarding the UE 20 (rescheduling) (S61). The eNB 30 then transmits, to the UE 20, the PDCCH to which the changed scheduling information is set (S62).

The UE 20 resumes monitoring of the PDCCH after transmitting the trigger signal. The UE 20 can thereby receive the PDCCH transmitted in Step S62 and detect a DCI format for multi-subframe scheduling.

In Step S59, the number of NACKs may be counted only in one period or may be counted over a plurality of periods. In the case of counting the number of NACKs only in one period, the counter of the number of NACKs may be cleared after transmitting the trigger signal or after expiration of one period. In the case of counting the number of NACKs over a plurality of periods, the counter of the number of NACKs may be cleared after transmitting the trigger signal.

Figure 11:
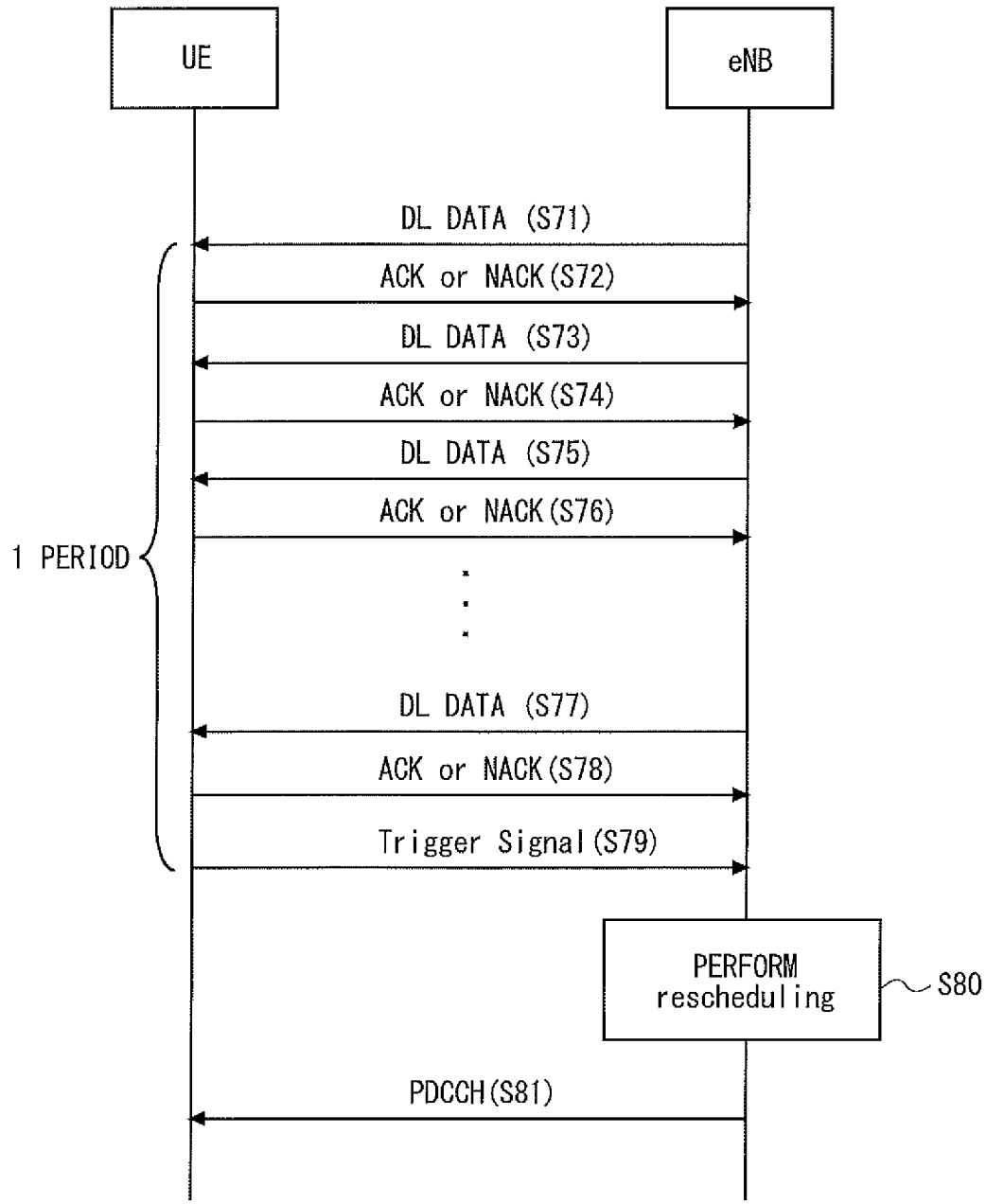
FIG. 11 is a view showing a flow of a trigger signal transmitting process according to the fourth exemplary embodiment.

An example of transmitting the trigger signal at different timing from the timing in FIG. 10 is described hereinafter with reference to FIG. 11. In FIG. 11, differently from FIG. 10, the UE 20 transmits the trigger signal to the eNB 30 at the time of expiration of one period.

Steps S71 to S77 are the same as Steps S51 to S57 in FIG. 10 and not redundantly described in detail. After that, the UE 20 transmits, to the eNB 30, ACK or NACK indicating whether the downlink data received in Step S77 has been decoded normally or not (S78).

When the UE 20 determines that one period has expired by the downlink data transmitted in Step S77, it transmits the trigger signal to the eNB 30 (S79). In Step S79, the UE 20 may set, to the trigger signal, information about the number of NACKs in the same period, a subframe number where the downlink data has not been decoded normally or the like.

When the eNB 30 receives the trigger signal transmitted from the UE 20, it changes the scheduling information of multi-subframe scheduling regarding the UE 20 (rescheduling) (S80). The eNB 30 then transmits, to the UE 20, the PDCCH to which the changed scheduling information is set (S81).

In Step S80, when the number of NACKs is smaller than an arbitrary threshold, for example, the eNB 30 may elongate the next period in multi-subframe scheduling in the UE 20. On the other hand, when the number of NACKs reaches an arbitrary threshold, it may switch scheduling for the UE 20 to dynamic scheduling, or may shorten the period in multi-subframe scheduling than the previous period.

Although the example in which the UE 20 transmits the trigger signal at the time of expiration of one period is described in FIG. 11, the UE 20 may transmit the trigger signal at any timing in one period. In other words, the trigger signal may be transmitted at arbitrary timing in one period, and the timing is not particularly limited.

Figure 12:
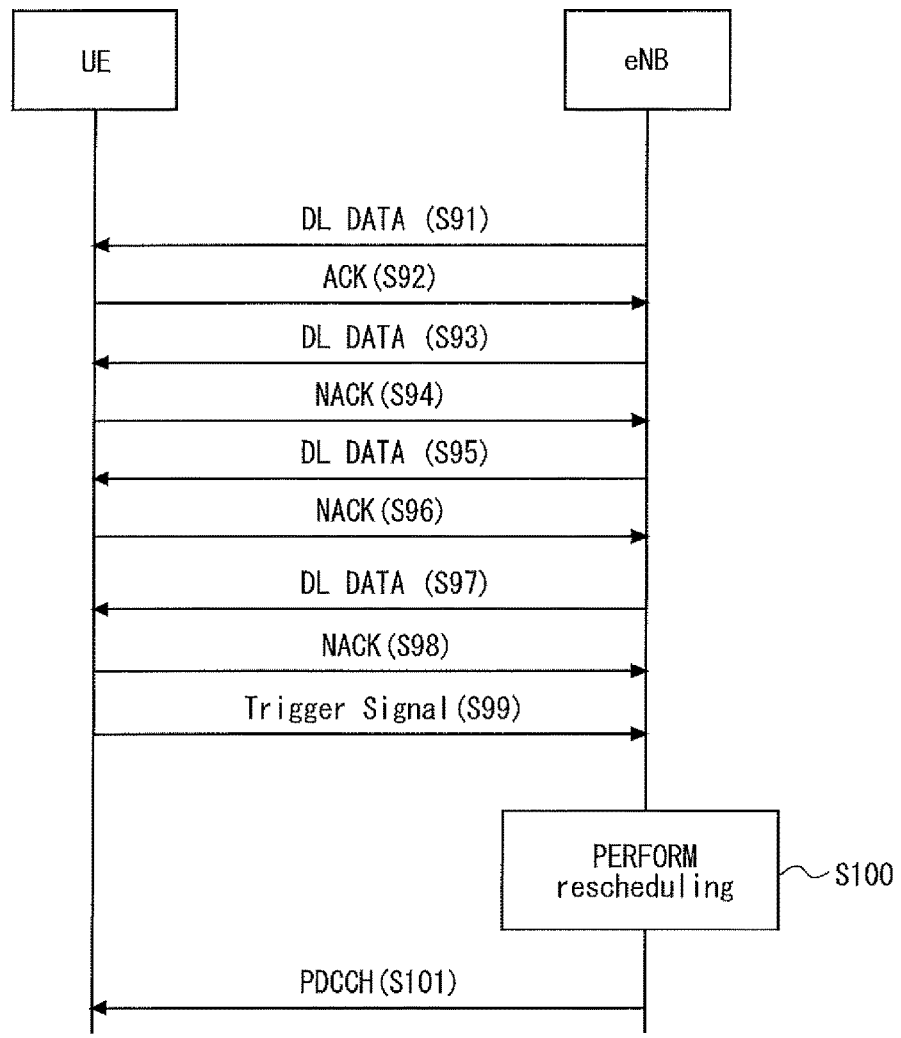
FIG. 12 is a view showing a flow of a trigger signal transmitting process according to the fourth exemplary embodiment.

An example of transmitting the trigger signal at different timing from the timing in FIG. 10 and FIG. 11 is described hereinafter with reference to FIG. 12. In FIG. 12, the UE 20 transmits the trigger signal when it has transmitted NACK an arbitrary number of times in succession. In the example of FIG. 12, the arbitrary number of times is three times.

First, the eNB 30 transmits downlink data to the UE 20 (S91). Next, the UE 20 transmits, to the eNB 30, ACK indicating that the downlink data transmitted in Step S91 has been decoded normally (S92).

Then, the eNB 30 transmits downlink data to the UE 20 (S93). Next, the UE 20 transmits, to the eNB 30, NACK indicating that the downlink data transmitted in Step S93 has not been decoded normally (S94). After that, it is assumed that the UE 20 transmits NACK to the eNB 30 in Steps S96 and S98, respectively indicating that the downlink data transmitted in Step S95 and the downlink data transmitted in Step S97 have not been decoded normally.

When the UE 20 transmits NACK in Step S98, it determines that the number of NACK transmission times has reached three times, which is an arbitrary number. At this time, the UE 20 transmits the trigger signal to the eNB 30 (S99). Steps S100 and S101 are the same as Steps S61 and S62 in FIG. 10 and not redundantly described in detail.

As described above, because only the UE 20 counts the number of NACK transmission times and transmits the trigger signal, the eNB 30 does not need to count the number of NACK transmission times. For example, in the case where the eNB 30 counts the number of NACK transmission times, if the eNB 30 wrongly decodes ACK transmitted from the UE 20 as NACK or decodes NACK as ACK, the values of the counters of the UE 20 and the eNB 30 fail to match. By counting the number of NACK transmission times only in the UE 20 with use of the trigger signal, it is possible to avoid such a problem.

Further, by performing the process shown in FIG. 10, it is possible to transmit the trigger signal before expiration of the period of multi-subframe scheduling. The eNB 30 can thereby change the scheduling information before expiration of the period. Therefore, the eNB 30 can change the scheduling information in response to a change in the wireless environment between the UE 20 and the eNB 30.

Further, because changing of the scheduling information within a period is not made in the process shown in FIG. 11, it is an effective procedure when treating downlink data that is less real-time compared with FIG. 10.

Further, because successive transmission of NACKs is detected and the trigger signal is transmitted by execution of the process shown in FIG. 12, the eNB 30 can change the scheduling information in the case where the wireless environment is temporarily degraded due to an abrupt change in the wireless environment.

Fifth Exemplary Embodiment

The setting of the scheduling information in multi-subframe scheduling according to a fifth exemplary embodiment of the present invention is described hereinafter with reference to FIG. 13. In the fifth exemplary embodiment, the timing when each UE monitors the PDCCH in the case where a plurality of UEs perform multi-subframe scheduling at the same time is described.

Figure 13:
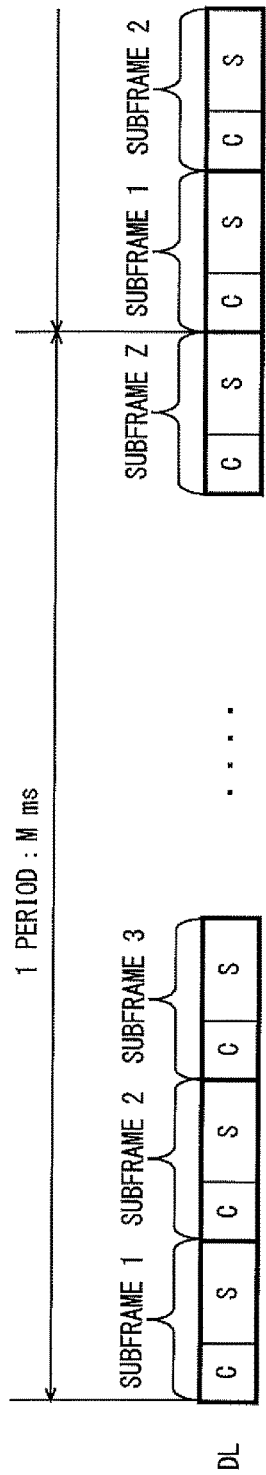
FIG. 13 is a view illustrating setting of scheduling information in multi-subframe scheduling according to a fifth exemplary embodiment.

FIG. 13 shows that the PDCCH is transmitted in all subframes, just like in the first to fourth exemplary embodiments. In the case where UE_A, UE_B and UE_C operate in the same period of multi-subframe scheduling, each of the UE_A, UE_B and UE_C may monitor the PDCCH in a different subframe from one another. For example, the UE_A may monitor the PDCCH that is transmitted in the subframe 1, the UE_B may monitor the PDCCH that is transmitted in the subframe 2, and the UE_C may monitor the PDCCH that is transmitted in the subframe 3.

Figure 14:
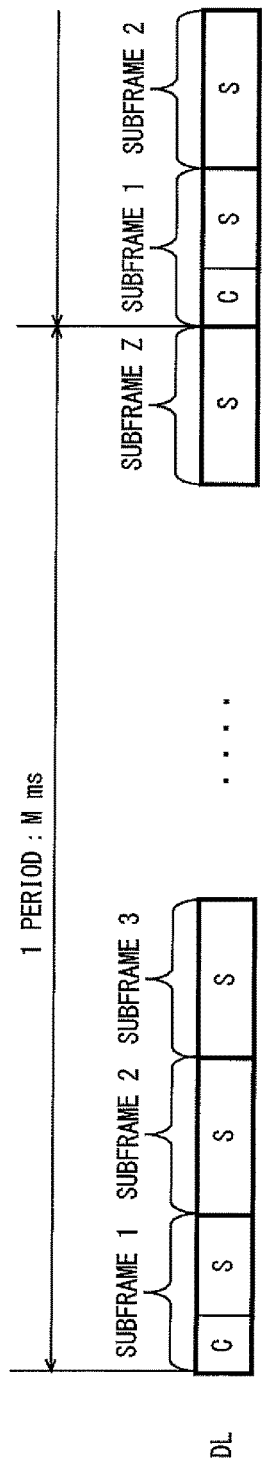
FIG. 14 is a view illustrating setting of scheduling information in multi-subframe scheduling according to the fifth exemplary embodiment.

On the other hand, FIG. 14 shows that the PDCCH is transmitted only in the initial subframe 1 of the period in multi-subframe scheduling where UE_A, UE_B and UE_C operate. In this case, each of the UE_A, UE_B and UE_C monitors the PDCCH that is transmitted in the subframe 1.

As shown in FIG. 13 and FIG. 14, each UE monitors the PDCCH only in an arbitrary subframe in the period of multi-subframe scheduling. It is thereby possible to suppress an increase in power consumption compared with the case of monitoring the PDCCH in all subframes.

Further, the eNB 30 can change the scheduling information of multi-subframe scheduling for each UE in accordance with a decoding result of downlink data in each UE, just like in the first to fourth exemplary embodiments. It is thereby possible to perform control so as to improve the throughput in the communication between the eNB 30 and each UE in accordance with a change in the wireless communication environment. Specifically, by changing the scheduling information in the eNB 30 just like in the first to fourth exemplary embodiments when monitoring each UEPDCCH at the timing shown in the fifth exemplary embodiment, it is possible to perform control so as to improve the throughput in the communication between the eNB 30 and each UE in accordance with a change in the wireless communication environment.

A threshold or the like described in the first to fifth exemplary embodiments may be a predetermined value.

Figure 15:
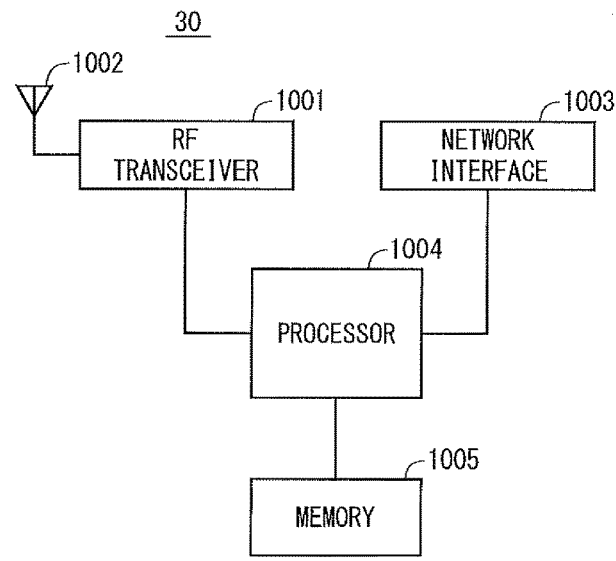
FIG. 15 is a block diagram of an eNB in each exemplary embodiment.

Configuration examples of the communication terminal 10, the UE 20, and the eNB 30 described in the plurality of exemplary embodiments are described hereinafter. FIG. 15 is a block diagram showing a configuration example of the eNB 30. Referring to FIG. 15, the eNB 30 includes an RF transceiver 1001, a network interface 1003, a processor 1004, and a memory 1005. The RF transceiver 1001 performs analog RF signal processing for communication with the UEs. The RF transceiver 1001 may include a plurality of transceivers. The RF transceiver 1001 is connected to an antenna 1002 and a processor 1004. The RF transceiver 1001 receives modulated symbol data (or OFDM symbol data) from the processor 1004, generates a transmission RF signal and supplies the transmission RF signal to the antenna 1002. Further, the RF transceiver 1001 generates a baseband received signal based on a received RF signal received by the antenna 1002 and supplies it to the processor 1004.

The network interface 1003 is used for communication with a network node (e.g., other eNBs, Mobility Management Entity (MME) and Serving Gateway (S-GW)). The network interface 1003 may include a network interface card (NIC) compliant to IEEE 802.3 series, for example.

The processor 1004 performs data plane processing including digital baseband signal processing and control plane processing for wireless communication. For example, in the case of LTE and LTE-Advanced, the digital baseband signal processing by the processor 1004 may include signal processing of PDCP layer, RLC layer, MAC layer and PHY layer. Further, the signal processing by the processor 1004 may include signal processing of GTP-U•UDP/IP layer in the X2-U interface and the S1-U interface. Furthermore, the control plane processing by the processor 1004 may include processing of X2AP protocol, S1-MME protocol and RRC protocol.

The processor 1004 may include a plurality of processors. For example, the processor 1004 may include a modem processor (e.g., DSP) that performs digital baseband signal processing, a processor (e.g., DSP) that performs signal processing of GTP-U•UDP/IP layer in the X2-U interface and the S1-U interface, and a protocol stack processor (e.g., CPU or MPU) that performs control plane processing.

The memory 1005 is a combination of a volatile memory and a nonvolatile memory. The memory 1005 may include a plurality of memory devices that are physically independent of one another. The volatile memory is a Static Random Access Memory (SRAM), a Dynamic RAM (DRAM), or a combination of them, for example. The nonvolatile memory is a mask Read Only Memory (MROM), an Electrically Erasable Programmable ROM (EEPROM), a flash memory, a hard disk drive, or a combination of them, for example. The memory 1005 may include a storage that is placed apart from the processor 1004. In this case, the processor 1004 may access the memory 1005 through the network interface 1003 or an I/O interface, which is not shown.

The memory 1005 may store a software module (computer program) containing a group of instructions and data for performing the processing by the eNB 30 described in the above plurality of exemplary embodiments. In several implementations, the processor 1004 may be configured to perform the processing of the eNB 30 described in the above exemplary embodiments by reading the software module from the memory 1005 and executing it.

Figure 16:
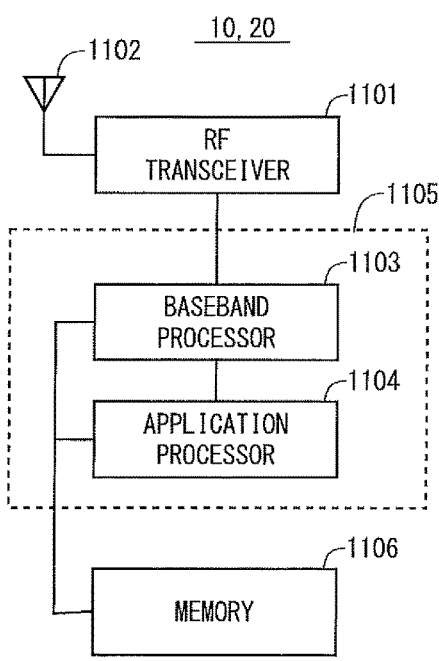
FIG. 16 is a block diagram of a communication terminal or a UE in each exemplary embodiment.

FIG. 16 is a block diagram showing a configuration example of the communication terminal 10 or the UE 20. A Radio Frequency (RF) transceiver 1101 performs analog RF signal processing for communication with the eNB 30. The analog RF signal processing performed by the RF transceiver 1101 includes frequency up-conversion, frequency down-conversion, and amplification. The RF transceiver 1101 is connected to an antenna 1102 and a baseband processor 1103. Specifically, the RF transceiver 1101 receives modulated symbol data (or OFDM symbol data) from the baseband processor 1103, generates a transmission RF signal and supplies the transmission RF signal to the antenna 1102. Further, the RF transceiver 1101 generates a baseband received signal based on a received RF signal received by the antenna 1102 and supplies it to the baseband processor 1103.

The baseband processor 1103 performs digital baseband signal processing (data plane processing) and control plane processing for wireless communication. The digital baseband signal processing includes (a) data compression/decompression, (b) data segmentation/concatenation, (c) transmission format (transmission frame) composition/decomposition, (d) transmission path encoding/decoding, (e) modulation (symbol mapping)/demodulation, and (f) OFDM symbol data (baseband OFDM signal) generation by Inverse Fast Fourier Transform (IFFT) and the like. On the other hand, the control plane processing includes communication management of Layer 1 (e.g., transmission power control), Layer 2 (e.g., radio resource management and hybrid automatic repeat request (HARQ) processing), and Layer 3 (e.g., attach, mobility, and signaling related to call management).

For example, in the case of LTE and LTE-Advanced, the digital baseband signal processing by the baseband processor 1103 may include signal processing of Packet Data Convergence Protocol (PDCP) layer, Radio Link Control (RLC) layer, MAC layer, and PHY layer. Further, the control plane processing by the baseband processor 1103 may include processing of Non-Access Stratum (NAS) protocol, RRC protocol, and MAC CE.

The baseband processor 1103 may include a modem processor (e.g., Digital Signal Processor (DSP)) that performs digital baseband signal processing and a protocol stack processor (e.g., Central Processing Unit (CPU) or Micro Processing Unit (MPU)) that performs control plane processing. In this case, the protocol stack processor that performs control plane processing may be made common to an application processor 1104, which is described below.

The application processor 1104 is also called a CPU, an MPU, a microprocessor or a processor core. The application processor 1104 may include a plurality of processors (a plurality of processor cores). The application processor 1104 implements each function of the communication terminal 10 or the UE 20 by running a system software program (Operating System (OS)) and various application programs (e.g., call application, web browser, mailer, camera control application, music playback application etc.) read from a memory 1106 or a memory, which is not shown.

In several implementations, as shown in the dotted line (1105) in FIG. 16, the baseband processor 1103 and the application processor 1104 may be integrated into one chip. In other words, the baseband processor 1103 and the application processor 1104 may be implemented as one System on Chip (SoC) device 1105. The SoC device is also called a system Large Scale Integration (LSI) or a chip set in some cases.

The memory 1106 is a volatile memory, a nonvolatile memory, or a combination of them. The memory 1106 may include a plurality of memory devices that are physically independent of one another. The volatile memory is a Static Random Access Memory (SRAM), a Dynamic RAM (DRAM), or a combination of them, for example. The nonvolatile memory is a mask Read Only Memory (MROM), an Electrically Erasable Programmable ROM (EEPROM), a flash memory, a hard disk drive, or a combination of them, for example. For example, the memory 1106 may include an external memory device that is accessible from the baseband processor 1103, the application processor 1104 and the SoC 1105. The memory 1106 may include an internal memory device that is integrated into the baseband processor 1103, the application processor 1104 or the SoC 1105. Further, the memory 1106 may include a memory in a Universal Integrated Circuit Card (UICC).

The memory 1106 may store a software module (computer program) containing a group of instructions and data for performing the processing by the communication terminal 10 or the UE 20 described in the above plurality of exemplary embodiments. In several implementations, the baseband processor 1103 or the application processor 1104 may be configured to perform the processing of the communication terminal 10 or the UE 20 described in the above exemplary embodiments by reading the software module from the memory 1106 and executing it.

As described with reference to FIGS. 15 and 16, each of processors included in the communication terminal 10, the UE 20 and the eNB 30 runs one or a plurality of programs including a group of instructions for causing a computer to perform the algorithms described using the drawings.

In the above example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, DVD-ROM (Digital Versatile Disc Read Only Memory), DVD-R (DVD Recordable)), DVD-R DL (DVD-R Dual Layer)), DVD-RW (DVD ReWritable)), DVD-RAM), DVD+R), DVR+R DL), DVD+ RW), BD-R (Blu-ray (registered trademark) Disc Recordable)), BD-RE (Blu-ray (registered trademark) Disc Rewritable)), BD-ROM), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

It should be noted that the present invention is not limited to the above-described exemplary embodiments and may be varied in many ways within the scope of the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2015-193033 filed on Sep. 30, 2015, the disclosure of which is incorporated herein in its entirety by reference.

Further, the whole or part of the exemplary embodiments disclosed above can be described as, but not limited to, the following supplementary notes.

Supplementary Note 1

A communication terminal comprising:
a monitoring unit configured to monitor control information containing allocation information of at least one subframe where downlink data is transmitted; and
a control unit configured to determine monitoring timing to monitor the control information in accordance with a decoding result of downlink data transmitted using the at least one subframe,
wherein the monitoring unit monitors the control information at the determined monitoring timing.

Supplementary Note 2

The communication terminal according to Supplementary Note 1, wherein when the monitoring unit receives the control information, the monitoring unit suspends monitoring of the control information until the next monitoring timing.

Supplementary Note 3

The communication terminal according to Supplementary Note 2, wherein the control unit determines whether or not to resume monitoring of the control information in accordance with any one of the number of times or percentage that the downlink data has been decoded normally and the number of times or percentage that the downlink data has not been decoded normally.

Supplementary Note 4

The communication terminal according to Supplementary Note 3, wherein the control unit determines to resume monitoring of the control information when the number of times or percentage that the downlink data has not been decoded normally exceeds a threshold in one arbitrary period.

Supplementary Note 5

The communication terminal according to Supplementary Note 4, further comprising:
a communication unit configured to transmit a first decoding result of the downlink data to a base station each time receiving the downlink data in an allocated subframe, and transmit a second decoding result to the base station when the number of times or percentage that the downlink data has not been decoded normally exceeds a threshold,
wherein the control unit determines to resume monitoring of the control information after the second decoding result is transmitted to the base station.

Supplementary Note 6

The communication terminal according to Supplementary Note 4, further comprising:
a communication unit configured to transmit a first decoding result of the downlink data to a base station each time receiving the downlink data in an allocated subframe, and transmit a second decoding result to the base station when the downlink data has not been decoded normally in succession,
wherein the control unit determines to resume monitoring of the control information after the second decoding result is transmitted to the base station.

Supplementary Note 7

The communication terminal according to Supplementary Note 4, further comprising:
a communication unit configured to transmit a first decoding result of the downlink data to a base station each time receiving the downlink data in an allocated subframe, and transmit a second decoding result to the base station at timing when the one arbitrary period expires,
wherein the control unit determines to resume monitoring of the control information after the second decoding result is transmitted to the base station.

Supplementary Note 8

The communication terminal according to any one of Supplementary Notes 4 to 7, wherein the control unit clears the number of times or percentage that the downlink data has not been decoded normally when the number of times or percentage that the downlink data has not been decoded normally exceeds a threshold or when the one arbitrary period expires.

Supplementary Note 9

The communication terminal according to Supplementary Note 3, wherein the control unit counts the number of times that the downlink data has not been decoded normally over a plurality of arbitrary periods, and resumes monitoring of the control information when the number of times that the downlink data has not been decoded normally exceeds a threshold.

Supplementary Note 10

The communication terminal according to Supplementary Note 9, further comprising:
a communication unit configured to transmit a first decoding result of the downlink data to a base station each time receiving the downlink data in an allocated subframe, and transmit a second decoding result to the base station when the number of times that the downlink data has not been decoded normally exceeds a threshold,
wherein the control unit determines to resume monitoring of the control information after the second decoding result is transmitted to the base station.

Supplementary Note 11

The communication terminal according to Supplementary Note 10, wherein the communication unit transmits the second decoding result to the base station when the downlink data has not been decoded normally a specified number of times in succession.

Supplementary Note 12

The communication terminal according to Supplementary Note 11, wherein the communication unit transmits the second decoding result to the base station at timing when a period including timing when the number of times that the downlink data has not been decoded normally exceeds a threshold expires.

Supplementary Note 13

The communication terminal according to any one of Supplementary Notes 9 to 12, wherein the control unit clears the number of times that the downlink data has not been decoded normally when the number of times that the downlink data has not been decoded normally exceeds a threshold.

Supplementary Note 14

A base station comprising:
a communication unit configured to transmit, to a communication terminal, control information containing allocation information of at least one subframe to transmit downlink data; and
a control unit configured to determine transmission timing to transmit the control information to the communication terminal in accordance with a decoding result of downlink data transmitted using the at least one subframe in the communication terminal,
wherein the communication unit transmits the control information at the determined transmission timing.

Supplementary Note 15

The base station according to Supplementary Note 14, wherein the control unit determines transmission timing to transmit the control information to the communication terminal in accordance with any one of the number of times or percentage that the downlink data has been decoded normally and the number of times or percentage that the downlink data has not been decoded normally in the communication terminal.

Supplementary Note 16

The base station according to Supplementary Note 15, wherein the control unit determines to transmit the control information in which the allocation information is changed to the communication terminal when the number of times or percentage that the downlink data has not been decoded normally in the communication terminal exceeds a threshold in one arbitrary period.

Supplementary Note 17

The base station according to Supplementary Note 15, wherein the control unit counts the number of times that the downlink data has not been decoded normally over a plurality of periods, and determines to transmit the control information in which the allocation information is changed to the communication terminal when the number of times that the downlink data has not been decoded normally in the communication terminal exceeds a threshold.

Supplementary Note 18

The base station according to Supplementary Note 14, wherein
the communication unit receives, from the communication terminal, a first decoding result related to the downlink data transmitted from the communication terminal in each allocated subframe, and receives a second decoding result transmitted from the communication terminal when the number of times or percentage that the downlink data has not been decoded normally in the communication terminal exceeds a threshold, and
the control unit determines transmission timing to transmit the control information to the communication terminal when the second decoding result is transmitted to the base station.

Supplementary Note 19

A monitoring method comprising:
monitoring control information containing allocation information of at least one subframe where downlink data is transmitted;
determining monitoring timing to monitor the control information in accordance with a decoding result of downlink data transmitted using the at least one subframe; and
monitoring the control information at the determined monitoring timing.

Supplementary Note 20

A transmission method comprising:
transmitting, to a communication terminal, control information containing allocation information of at least one subframe to transmit downlink data;
determining transmission timing to transmit the control information to the communication terminal in accordance with a decoding result of downlink data transmitted using the at least one subframe in the communication terminal; and
transmitting the control information at the determined transmission timing.

Supplementary Note 21

A program causing a computer to execute:
monitoring control information containing allocation information of at least one subframe where downlink data is transmitted;

determining monitoring timing to monitor the control information in accordance with a decoding result of downlink data transmitted using the at least one subframe; and
monitoring the control information at the determined monitoring timing.

Supplementary Note 22

A program causing a computer to execute:
transmitting, to a communication terminal, control information containing allocation information of at least one subframe to transmit downlink data;
determining transmission timing to transmit the control information to the communication terminal in accordance with a decoding result of downlink data transmitted using the at least one subframe in the communication terminal; and
transmitting the control information at the determined transmission timing.

REFERENCE SIGNS LIST

10 Communication Terminal
11 Monitoring Unit
12 Control Unit
20 UE
21 Monitoring Unit
22 Control Unit
23 Communication Unit
30 eNB
31 Communication Unit
32 Control Unit

What is claimed is:
1. A communication terminal comprising:
at least one memory storing instructions, and
at least one processor configured to execute the instructions to;
monitor control information containing allocation information of at least one subframe where downlink data is transmitted;
determine monitoring timing to monitor the control information in accordance with a decoding result of downlink data transmitted using the at least one subframe
monitor the control information at the determined monitoring timing;
when the control information is received, execute the instructions to suspend monitoring of the control information until the next monitoring timing; and
execute the instructions to determine whether or not to resume monitoring of the control information in accordance with any one of the number of times or percentage that the downlink data has been decoded normally and the number of times or percentage that the downlink data has not been decoded normally.

2. The communication terminal according to claim 1, wherein the at least one processor is further configured to execute the instructions to determine to resume monitoring of the control information when the number of times or percentage that the downlink data has not been decoded normally exceeds a threshold in one arbitrary period.

3. The communication terminal according to claim 2, wherein the at least one processor is further configured to execute the instructions to;
transmit a first decoding result of the downlink data to a base station each time the downlink data in an allocated subframe is received, transmit a second decoding result to the base station when the number of times or percentage that the downlink data has not been decoded normally exceeds a threshold, and determine to resume monitoring of the control information after the second decoding result is transmitted to the base station.

4. The communication terminal according to claim 2, wherein the at least one processor is further configured to execute the instructions to;

transmit a first decoding result of the downlink data to a base station each time the downlink data in an allocated subframe is received, transmit a second decoding result to the base station when the downlink data has not been decoded normally in succession, and determine to resume monitoring of the control information after the second decoding result is transmitted to the base station.

5. The communication terminal according to claim 2, wherein the at least one processor is further configured to execute the instructions to;

transmit a first decoding result of the downlink data to a base station each time the downlink data in an allocated subframe is received, transmit a second decoding result to the base station at a timing when the one arbitrary period expires, and determine to resume monitoring of the control information after the second decoding result is transmitted to the base station.

6. The communication terminal according to claim 2, wherein the at least one processor is further configured to execute the instructions to clear the number of times or percentage that the downlink data has not been decoded normally when the number of times or percentage that the downlink data has not been decoded normally exceeds a threshold or when the one arbitrary period expires.

7. The communication terminal according to claim 1, wherein the at least one processor is further configured to execute the instructions to; count the number of times that the downlink data has not been decoded normally over a plurality of arbitrary periods, and resume monitoring of the control information when the number of times that the downlink data has not been decoded normally exceeds a threshold.

8. The communication terminal according to claim 7, wherein the at least one processor is further configured to execute the instructions to;

transmit a first decoding result of the downlink data to a base station each time the downlink data in an allocated subframe is received, transmit a second decoding result to the base station when the number of times that the downlink data has not been decoded normally exceeds a threshold, and determine to resume monitoring of the control information after the second decoding result is transmitted to the base station.

9. The communication terminal according to claim 8, wherein the at least one processor is further configured to execute the instructions to transmit the second decoding result to the base station when the downlink data has not been decoded normally a specified number of times in succession.

10. The communication terminal according to claim 9, wherein the at least one processor is further configured to execute the instructions to transmit the second decoding result to the base station at a timing when a period including a timing when the number of times that the downlink data has not been decoded normally exceeds a threshold expires.

11. The communication terminal according to claim 7, wherein the at least one processor is further configured to execute the instructions to clear the number of times that the downlink data has not been decoded normally when the number of times that the downlink data has not been decoded normally exceeds a threshold.

12. A base station comprising:

at least one memory storing instructions, and at least one processor configured to execute the instructions to;

transmit, to a communication terminal, control information containing allocation information of at least one subframe to transmit downlink data;

determine transmission timing to transmit the control information to the communication terminal in accordance with a decoding result of downlink data transmitted using the at least one subframe in the communication terminal;

transmit the control information at the determined transmission timing;

execute the instructions to determine transmission timing to transmit the control information to the communication terminal in accordance with any one of the number of times or percentage that the downlink data has been decoded normally and the number of times or percentage that the downlink data has not been decoded normally in the communication terminal.

13. The base station according to claim 12, wherein the at least one processor is further configured to execute the instructions to determine to transmit the control information in which the allocation information is changed to the communication terminal when the number of times or percentage that the downlink data has not been decoded normally in the communication terminal exceeds a threshold in one arbitrary period.

14. The base station according to claim 12, wherein the at least one processor is further configured to execute the instructions to; count the number of times that the downlink data has not been decoded normally over a plurality of periods, and determine to transmit the control information in which the allocation information is changed to the communication terminal when the number of times that the downlink data has not been decoded normally in the communication terminal exceeds a threshold.

15. The base station according to claim 12, wherein the at least one processor is further configured to execute the instructions to;

receive, from the communication terminal, a first decoding result related to the downlink data transmitted from the communication terminal in each allocated subframe, and receives a second decoding result transmitted from the communication terminal when the number of times or percentage that the downlink data has not been decoded normally in the communication terminal exceeds a threshold, and determine transmission timing to transmit the control information to the communication terminal when the second decoding result is transmitted to the base station.

16. A monitoring method comprising:

monitoring control information containing allocation information of at least one subframe where downlink data is transmitted;

determining monitoring timing to monitor the control information in accordance with a decoding result of downlink data transmitted using the at least one subframe;

monitoring the control information at the determined monitoring timing;

when the control information is received, execute the instructions to suspend monitoring of the control information until the next monitoring timing; and execute the instructions to determine whether or not to resume monitoring of the control information in accordance with any one of the number of times or percentage that the downlink data has been decoded normally and the number of times or percentage that the downlink data has not been decoded normally.

* * * * *